(12) United States Patent
Azzouz et al.

(10) Patent No.: US 12,330,493 B2
(45) Date of Patent: Jun. 17, 2025

(54) COOLING MODULE FOR A MOTOR VEHICLE HAVING A TANGENTIAL TURBOMACHINE

(71) Applicant: Valeo Systemes Thermiques, Le Mesnil Saint-Denis (FR)

(72) Inventors: Kamel Azzouz, Le Mesnil Saint Denis (FR); Sébastien Garnier, Le Mesnil Saint Denis (FR); Amrid Mammeri, Le Mesnil Saint Denis (FR)

(73) Assignee: Valeo Systemes Thermiques, Le Mesnil-Saint-Denis (FR)

( * ) Notice: Subject to any disclaimer, the term of this patent is extended or adjusted under 35 U.S.C. 154(b) by 206 days.

(21) Appl. No.: 17/641,625

(22) PCT Filed: Sep. 8, 2020

(86) PCT No.: PCT/FR2020/051547
§ 371 (c)(1),
(2) Date: Mar. 9, 2022

(87) PCT Pub. No.: WO2021/048495
PCT Pub. Date: Mar. 18, 2021

(65) Prior Publication Data
US 2022/0348072 A1    Nov. 3, 2022

(30) Foreign Application Priority Data
Sep. 10, 2019  (FR) ..................................... 1909957

(51) Int. Cl.
*B60K 11/04* (2006.01)
*B60K 11/08* (2006.01)
(Continued)

(52) U.S. Cl.
CPC .............. *B60K 11/04* (2013.01); *B60K 11/08* (2013.01); *F01P 5/06* (2013.01); *F01P 11/10* (2013.01)

(58) Field of Classification Search
CPC ............. B60K 11/04; B60K 11/08; F01P 5/06
See application file for complete search history.

(56) References Cited

U.S. PATENT DOCUMENTS 5,029,442 A * 7/1991 Nishiyama ............ F02B 37/166
237/12.1
6,298,906 B1   10/2001 Vize
(Continued)

FOREIGN PATENT DOCUMENTS

CN        1957165 A    5/2007
CN      102442199 A    5/2012
(Continued)

OTHER PUBLICATIONS

Office action issued in counterpart Chinese Application No. 202080063430.1, dated Sep. 7, 2023 (7 pages).
(Continued)

*Primary Examiner* — Long T Tran
(74) *Attorney, Agent, or Firm* — Osha Bergman Watanabe & Burton LLP

(57) ABSTRACT

The invention relates to a cooling module (22) for a motor vehicle, preferably having an electric motor, comprising: —at least one heat exchanger (24, 26, 28), —at least one tangential turbomachine (30) capable of creating a flow of air in contact with said at least one heat exchanger (24, 26, 28), and —a fairing (40) for housing said at least one heat exchanger (24, 26, 28), wherein the fairing (40) comprises at least one indentation (34-1, 34-2, 36-1, 36-2, 38-1, 38-2) for retaining at least one heat exchanger.

8 Claims, 5 Drawing Sheets

(51) Int. Cl.
*F01P 5/06* (2006.01)
*F01P 11/10* (2006.01)

(56) References Cited

U.S. PATENT DOCUMENTS

| | | | |
|---|---|---|---|
| 6,341,643 B1* | 1/2002 | Osakabe | F04D 17/04 |
| | | | 165/41 |
| 2005/0029027 A1* | 2/2005 | Kunikata | B60K 11/02 |
| | | | 180/68.1 |
| 2008/0185125 A1* | 8/2008 | Prior | B60K 11/04 |
| | | | 165/86 |
| 2009/0145409 A1* | 6/2009 | Noyama | F28D 1/0461 |
| | | | 165/104.11 |
| 2010/0089088 A1* | 4/2010 | Kardos | F02B 29/0475 |
| | | | 165/104.34 |
| 2010/0229548 A1* | 9/2010 | Kardos | F02B 29/0431 |
| | | | 60/599 |
| 2011/0246023 A1* | 10/2011 | Lockwood | F01P 7/10 |
| | | | 123/41.04 |
| 2013/0133963 A1* | 5/2013 | Ajisaka | B60K 11/04 |
| | | | 180/68.1 |
| 2015/0322845 A1* | 11/2015 | Nam | B60T 5/00 |
| | | | 123/41.21 |
| 2019/0143804 A1* | 5/2019 | Moestam | B60K 11/085 |
| | | | 180/68.1 |
| 2019/0211739 A1* | 7/2019 | Maeda | B60K 11/06 |

FOREIGN PATENT DOCUMENTS

| | | |
|---|---|---|
| CN | 104080693 A | 10/2014 |
| CN | 105209291 A | 12/2015 |
| CN | 105283337 A | 1/2016 |
| CN | 106687323 A | 5/2017 |
| DE | 3814086 A1 | 11/1988 |
| DE | 102013103551 A1 | 10/2014 |
| EP | 233174 A1 | 8/1987 |
| EP | 1243455 A2 | 9/2002 |
| GB | 1488257 A | 10/1977 |
| GB | 2117721 A | 10/1983 |

OTHER PUBLICATIONS

International Search Report and Written Opinion in corresponding International Application No. PCT/FR2020/051547, dated Oct. 19, 2020 (12 pages).

* cited by examiner

COOLING MODULE FOR A MOTOR VEHICLE HAVING A TANGENTIAL TURBOMACHINE

TECHNICAL FIELD

The invention relates to a cooling module for a motor vehicle, preferably for an electric motor vehicle, having a tangential turbomachine. The invention also relates to a motor vehicle provided with such a cooling module.

PRIOR ART

A cooling module (or heat exchange module) of a motor vehicle conventionally comprises at least one heat exchanger and a ventilation device that is designed to generate an air flow in contact with the at least one heat exchanger. The ventilation device thus allows, for example, an air flow to be generated in contact with the heat exchanger when the vehicle is stationary.

In conventional motor vehicles with a heat engine, the at least one heat exchanger is substantially square shaped, with the ventilation device then being an impeller fan, the diameter of which is substantially equal to the side of the square formed by the heat exchanger.

Conventionally, the heat exchanger is then placed opposite at least two cooling openings formed in the front face of the body of the motor vehicle. A first cooling opening is situated above the bumper, while a second opening is situated below the bumper. Such a configuration is preferred as the heat engine also must be supplied with air, with the air intake of the engine conventionally being situated in the passage of the air flow passing through the upper cooling opening.

However, electric vehicles are preferably only provided with cooling openings situated below the bumper, more preferably with a single cooling opening situated below the bumper.

Indeed, the electric motor does not need an air supply. Furthermore, the reduction in the number of cooling openings allows the aerodynamic characteristics of the electric vehicle to be improved. This is also reflected by better autonomy and a higher top speed of the motor vehicle.

Under these conditions, the use of a conventional cooling module appears to be unsatisfactory. Indeed, a majority of heat exchangers are no longer correctly cooled by the air flow solely originating from the lower cooling opening(s).

An aim of the invention is to propose a cooling module for a motor vehicle, preferably for an electric motor vehicle, that does not have at least some of the aforementioned disadvantages.

SUMMARY

To this end, a cooling module for a motor vehicle is proposed, preferably having an electric motor, comprising at least one heat exchanger, at least one tangential turbomachine capable of creating an air flow in contact with said at least one heat exchanger, and an air intake part designed to allow an air flow to enter the module and to guide said air flow at least up to said at least one heat exchanger.

Thus, advantageously, the dimensions of the heat exchanger(s) are suitable for being cooled by means of one or more lower cooling openings only. Furthermore, the tangential turbomachine allows an air flow to be created through the heat exchanger(s) with much better efficiency than if an impeller fan was implemented.

Moreover, the air intake part provides a better seal for the cooling module, thereby improving the performance capabilities thereof.

In addition, the intake part allows the cooling module to be adapted to the dimensions of the cooling opening, on the one hand, and to the dimensions of the heat exchanger, on the other hand.

According to another aspect, the air intake part comprises an air intake and an air guide wall between said air intake and said at least one heat exchanger.

According to another aspect, in a position whereby the cooling module is installed in the vehicle, the guide wall has a convergent shape in a horizontal plane from the air intake toward said at least one heat exchanger.

According to another aspect, in a position whereby the cooling module is installed in the vehicle, the guide wall has a divergent shape in a vertical plane from the air intake toward said at least one heat exchanger.

According to another aspect, the depth of the air intake part ranges between 10 cm and 30 cm.

According to another aspect, the depth of the air intake part ranges between 15 cm and 20 cm.

According to another aspect, the module comprises a fairing for housing said at least one heat exchanger.

According to another aspect, the depth of the fairing ranges between 10 cm and 20 cm.

According to another aspect, the depth of the fairing ranges between 10 cm and 15 cm.

According to another aspect, the module comprises a casing for housing said at least one tangential turbomachine, with a depth ranging between 10 cm and 20 cm.

A further aim of the invention is a motor vehicle, comprising a body, a bumper and a cooling module as previously described, the body defining at least one cooling opening positioned below the bumper, the cooling module being positioned facing the at least one cooling opening.

BRIEF DESCRIPTION OF THE DRAWINGS

Further features, details and advantages of the invention will become more clearly apparent upon reading the following description. This description is purely illustrative and should be read with reference to the appended drawings, in which.

DESCRIPTION OF THE EMBODIMENTS

It should be noted that, in the illustrated embodiment, the turbomachine operates by suction, i.e. it sucks in the ambient air in order to direct it into contact with the various heat exchangers, as will be described hereafter. Alternatively, however, each turbomachine operates by blowing, blowing the air toward the various heat exchangers.

Figure 1:
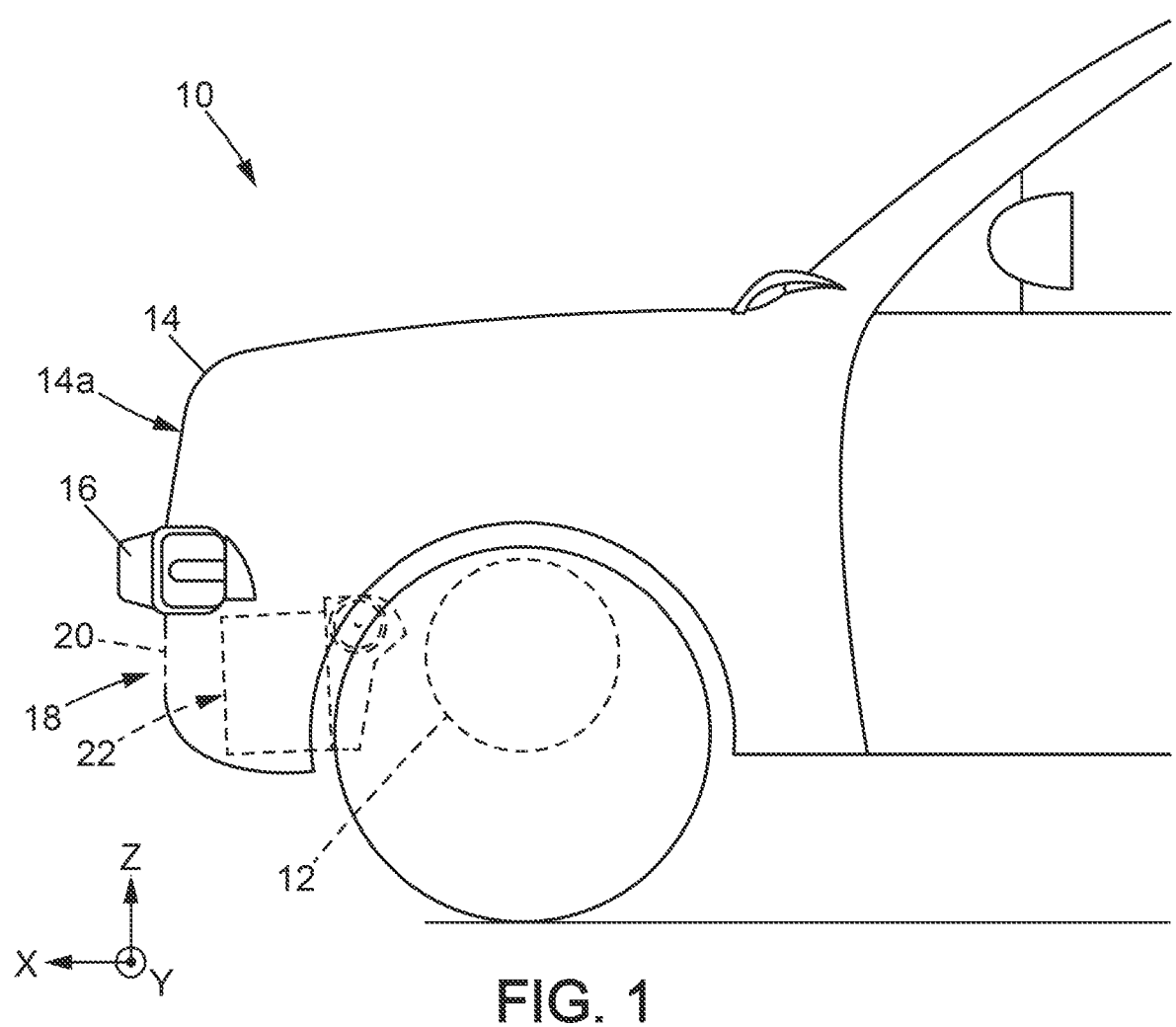
FIG. 1 schematically shows the front part of a motor vehicle, as a side view.

FIG. 1 schematically shows the front part of a motor vehicle 10 that can comprise an electric motor 12. The vehicle 10 particularly comprises a body 14 and a bumper 16 borne by a chassis (not shown) of the motor vehicle 10. The body 14 defines a cooling opening 18, that is, an opening through the body 14. In this case, there is only one cooling opening 18. This cooling opening 18 is situated in the lower part of the front face 14a of the body 14. In the illustrated example, the cooling opening 18 is situated below the bumper 16. A grille 20 can be positioned in the cooling opening 18 to prevent projectiles from being able to pass through the cooling opening 18. A cooling module 22 is positioned facing the cooling opening 18. The grille 20 in particular provides protection for the cooling module 22.

In FIGS. 1 to 5, a first direction, denoted X, corresponds to a longitudinal direction of the vehicle. It also corresponds to the direction of travel of the vehicle. A second direction, denoted Y, is a lateral or transverse direction. Finally, a third direction, denoted Z, is vertical. The directions X, Y, Z are orthogonal in pairs.

In FIGS. 1 to 5, the cooling module according to the present invention is illustrated in an operational position, i.e. when it is fitted on a motor vehicle.

The cooling module 22 comprises at least one heat exchanger. In FIGS. 2 to 5, the ventilation device 1 comprises three heat exchangers 24, 26, 28. However, it could comprise more or less depending on the desired design.

According to the illustrated embodiment, each of the heat exchangers has a general parallelepiped shape that is determined by a length, a thickness and a height. The length extends in the Y direction, the thickness extends in the X direction and the height extends in the Z direction.

The cooling module 22 also comprises at least one tangential fan, also called tangential turbomachine hereafter, which sucks in an air flow F intended for the heat exchangers 24, 26, 28. On the illustrated embodiment, the cooling module comprises a turbomachine 30. However, the cooling module can comprise a plurality of turbomachines 30 that can be positioned in various configurations (not described in this application).

The tangential turbomachine 30 comprises a rotor or turbine 32 (or tangential impeller). The turbine assumes a substantially cylindrical shape. The turbine advantageously comprises a plurality of stages of blades (or vanes), not illustrated. The turbine is rotatably mounted around an axis of rotation A, for example, parallel to the Y direction.

The turbomachine 30 is housed in a casing 34 comprising an outlet 36 forming an air outlet of the module 22.

As the figures also show, the cooling module 22 comprises an air intake part 38 designed to allow an air flow F to enter the module 22 and to guide said air flow F at least up to the heat exchangers 24, 26 and 28.

The cooling module 22 also comprises a casing or fairing 40 forming an internal air channel. The fairing 40 allows at least the heat exchangers 24, 26, 28 to be housed.

The intake part 38 is rigidly connected to the fairing 40 and to the casing 34. The intake part 38 and the fairing 40 could also form a single piece.

The intake part 38 will now be described.

Figure 2:
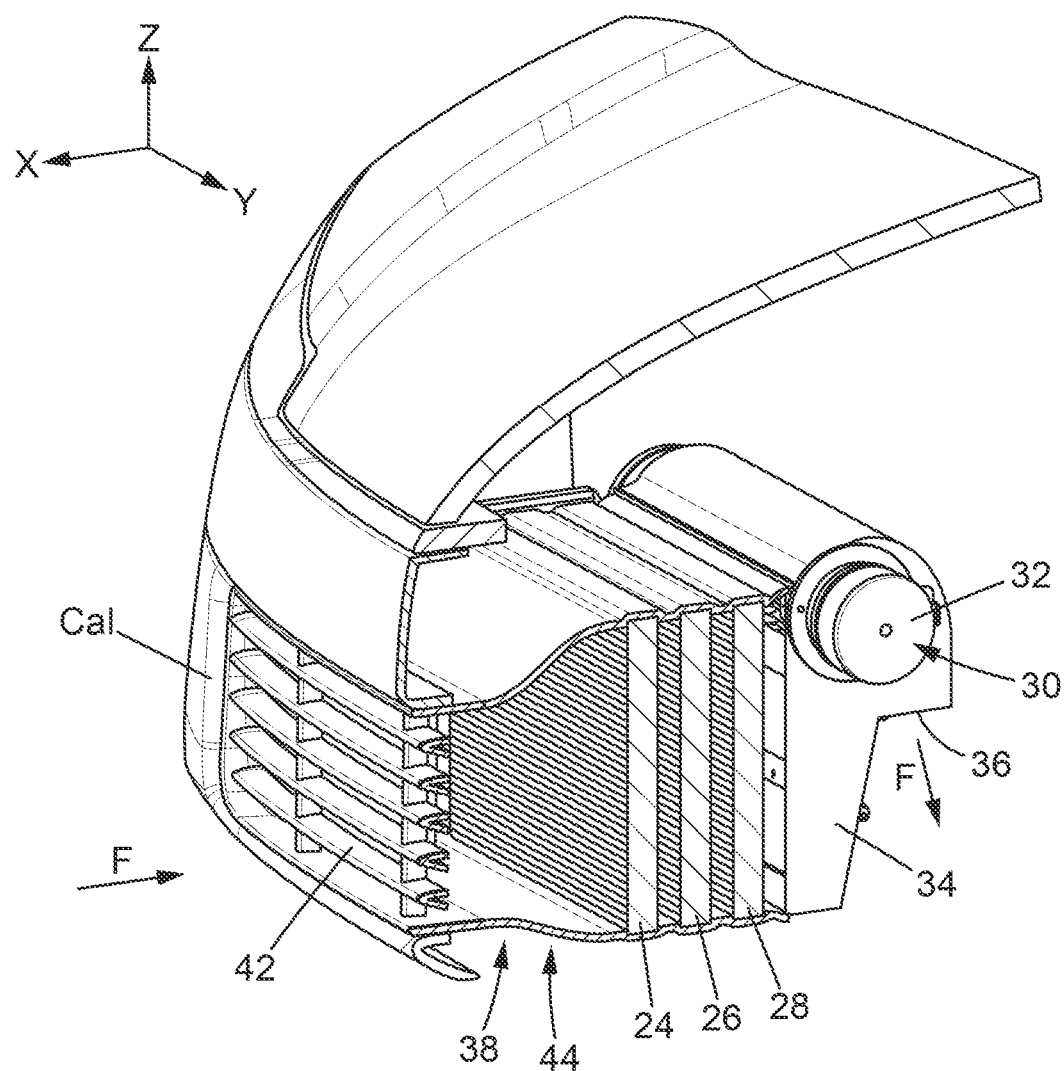
FIG. 2 is a perspective view of part of the front face of FIG. 1, comprising a cooling module according to one embodiment.
Figure 3:
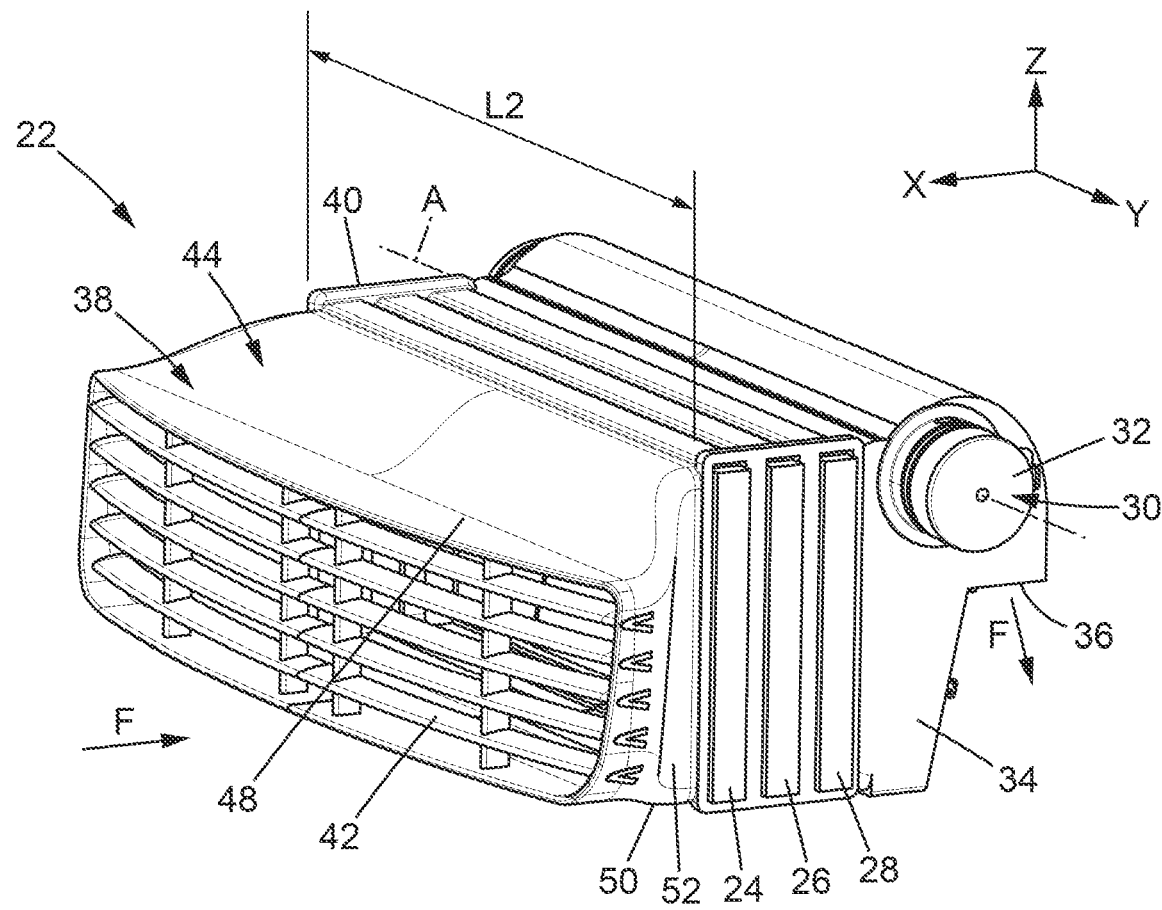
FIG. 3 is a perspective view of the cooling module of FIG. 2.
Figure 4:
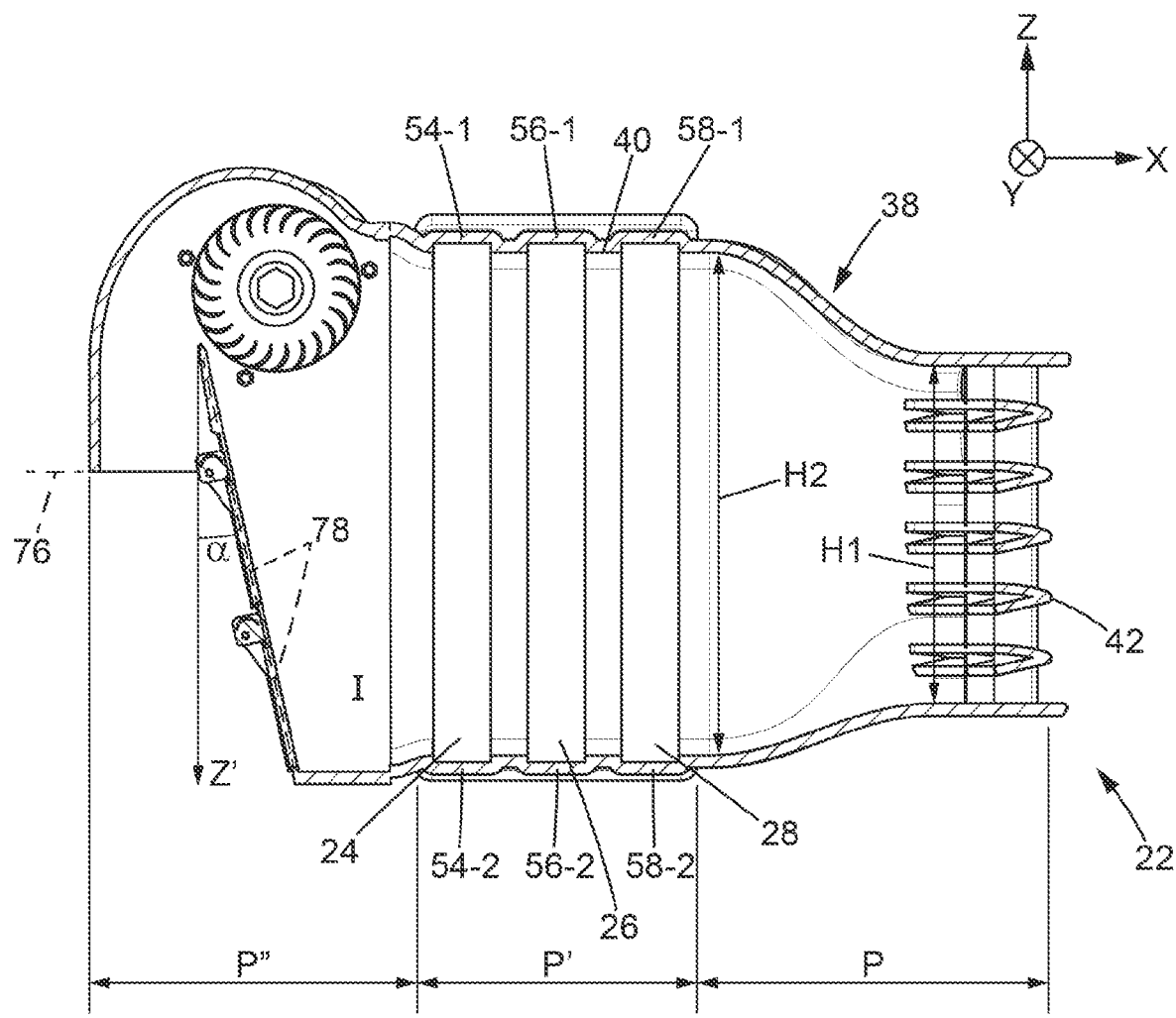
FIG. 4 is a side view of the module of FIG. 3.

As illustrated in FIGS. 2 to 4, the intake part 38 comprises an intake 42. The intake 42 forms the intake of the cooling module 22.

The intake part 38 also comprises a wall 44 for guiding air. The wall 44 is designed to guide the air flow F between the air intake 42 and the heat exchangers 24, 26, 28.

The air intake 42 is positioned in the cooling opening 18 whilst preferably being hermetically connected to the grill Cal.

The intake 42 is advantageously provided with a grille 46 for protecting the exchangers. The grille can be provided with movably or fixedly mounted flaps.

The guide wall 44 is made up of an upper wall 48, a lower wall 50 and two side walls 52 extending between the air intake 42 and the fairing 40.

The set of upper 48, lower 50 and side 52 walls ensures that the guide wall 44 forms a sealed channel between the air intake 42 and the fairing 40.

Figure 5:
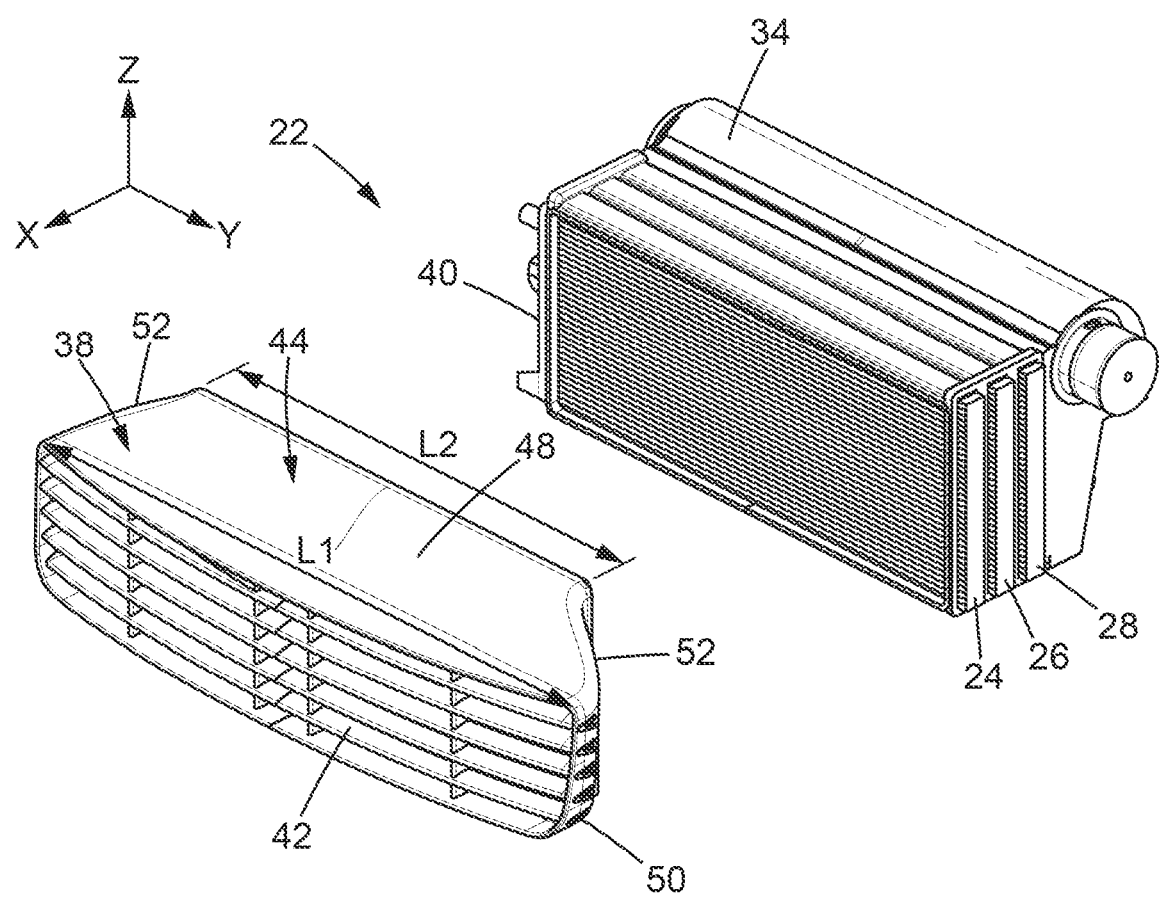
FIG. 5 is a partially exploded perspective view of the module of FIG. 3.

As is particularly shown in FIG. 5, the guide wall 48 has a convergent shape in a horizontal plane (X, Y) from the air intake 42 toward the exchangers 24, 26, 28.

In other words, a length L1 of the upper wall 48 at the air intake 42 is longer than a length L2 of the upper wall 48 at the fairing 40.

Similarly, a length L1 of the lower wall 50 at the air intake 42 is longer than a length L2 of the lower wall 50 at the fairing 40.

The length L1 corresponds to the length of the air intake 42, whereas the length L2 corresponds to the length of the fairing 40.

As is particularly shown in FIG. 4, the guide wall has a divergent shape in a vertical plane (X, Z) from the air intake 42 toward the heat exchangers 24, 26, 28.

In other words, a height H1 of the side walls 52 at the air intake 42 is lower than a height H2 of the side walls 52 at the fairing 40.

This convergent-divergent configuration ensures that the intake part 38 forms an adaptive interface between the air intake 42 and the fairing 40. Thus, by virtue of the intake part 38, a large air intake and smaller exchangers can be provided, without increasing pressure drops.

Reference will now be made to certain dimensions of the cooling module 22, illustrated in FIGS. 3 and 4.

The depth P of the intake part 38 corresponds to the distance (in the X direction) between the air intake 42 and the fairing 40. Advantageously, the depth P ranges between 10 cm and 30 cm, in particular between 15 cm and 20 cm, preferably between 18.1 cm and 18.5 cm.

For its part, the depth P' (in the X direction) of the fairing ranges between 10 cm and 20 cm, advantageously between 10 cm and 15 cm, preferably between 13.5 cm and 14 cm.

The depth P" of the casing 34 ranges between 10 cm and 20 cm, advantageously between 15 cm and 20 cm, preferably between 15.5 cm and 16 cm. A maximum height H" of the casing 48 ranges between 25 cm and 35 cm, advantageously between 28 cm and 32 cm, preferably of the order of 30 cm.

For its part, the length L2 ranges between 65 cm and 75 cm, advantageously between 65 cm and 70 cm, preferably between 66 cm and 67 cm.

It should be noted that the fairing 40 comprises two indentations 54-1, 54-2, 56-1, 56-2, 58-1, 58-2 respectively associated with the heat exchanger 24, 26, 28 in pairs. The indentations allow the seal of the module 22 to be improved and allow each exchanger to be held in position in the fairing 40.

It also should be noted that the outlet 36 of the casing 48 is advantageously provided with a grille 76 (shown by dashed lines in FIG. 4), in order to protect the module 22 against any projectiles, which, without the grille, could reach the turbomachine or the heat exchangers.

As is more specifically shown in FIG. 4, the cooling module 22 can comprise an opening and/or closing device. This device can assume various forms, such as, for example, the form of a plurality of flaps 78 pivotably mounted between an open position and a closed position. The open position is particularly advantageous when the vehicle is at high speed, when the turbomachine is stopped, whereas the closed position is advantageous when the vehicle is at low speed, when the turbomachine operates.

In the illustrated embodiment, the flaps 78 are mounted parallel to the axis of rotation A of the turbomachine 30. However, the invention is not limited to this configuration and the flaps 78 also can be positioned perpendicular to the axis A.

In the closed position, the flaps 78 are positioned in a plane I (shown by the dashed lines in FIG. 4) forming a non-zero angle α with a direction Z′ opposite the direction Z, preferably ranging between 5 and 20°. This angle ensures even air distribution over the heat exchangers 24, 26, 28.

It should be noted that the fairing 40 is advantageously produced from plastic material, for example, a PP or PA6 polymer, or even from a set of two materials, a rigid plastic forming reinforcements and a foam positioned between the reinforcements.

It also should be noted that the cooling module 22 is advantageously forcibly integrated in the cooling opening 18, with a sealing element, such as a lip seal and/or foam, being able to be integrated between the intake 42 and the opening 18.

The invention claimed is:

1. A cooling module for a motor vehicle having an electric motor, comprising:
   at least one heat exchanger;
   at least one tangential turbomachine capable of creating an air flow in contact with said at least one heat exchanger;
   a fairing for housing the at least one heat exchanger;
   an air intake part configured to allow an air flow to enter the cooling module and to guide said air flow at least up to said at least one heat exchanger,
   wherein the air intake part comprises an air intake and an air guide wall between said air intake and said at least one heat exchanger,
   wherein, in a position whereby the cooling module is installed in the motor vehicle, the air guide wall has a divergent shape in a vertical plane from the air intake toward said at least one heat exchanger,
   wherein the fairing is connected to the guide wall, and
   wherein the fairing engages both ends of the heat exchanger in said vertical plane.

2. The cooling module as claimed in claim 1, wherein, in a position whereby the cooling module is installed in the motor vehicle, the air guide wall has a convergent shape in a horizontal plane from the air intake toward said at least one heat exchanger.

3. The cooling module as claimed in claim 1, wherein a depth of the air intake part ranges between 10 cm and 30 cm.

4. The cooling module as claimed in claim 3, wherein the depth of the air intake part ranges between 15 cm and 20 cm.

5. The cooling module as claimed in claim 1, wherein the fairing has a depth ranging between 10 cm and 20 cm.

6. The cooling module as claimed in claim 5, wherein the depth of the fairing ranges between 10 cm and 15 cm.

7. The cooling module as claimed in claim 5, further comprising a casing for housing said at least one tangential turbomachine, with a depth ranging between 10 cm and 20 cm.

8. A motor vehicle having an electric motor comprising a body, a bumper and a cooling module as claimed in claim 1, the body defining at least one cooling opening positioned below the bumper, the cooling module being positioned facing the at least one cooling opening.

* * * * *